May 18, 1965 E. S. HOOBLER 3,184,026

VENDING MACHINE

Filed April 1, 1963 5 Sheets-Sheet 1

INVENTOR.
ERNEST S. HOOBLER
BY Forrest J. Lilly
ATTORNEY

VENDING MACHINE

Filed April 1, 1963

INVENTOR.
ERNEST S. HOOBLER
BY Forrest J. Lilly
ATTORNEY

INVENTOR.

ERNEST S. HOOBLER

BY Forrest J. Lilly

ATTORNEY

INVENTOR.

ERNEST S. HOOBLER

BY Forrest J. Lilly

ATTORNEY

May 18, 1965 E. S. HOOBLER 3,184,026

VENDING MACHINE

Filed April 1, 1963

5 Sheets-Sheet 5

INVENTOR.
ERNEST S. HOOBLER
BY Forrest J. Lilly
ATTORNEY

United States Patent Office 3,184,026

Patented May 18, 1965

3,184,026

VENDING MACHINE

Ernest S. Hoobler, Torrance, Calif., assignor to Mercury International Insurance Underwriters, Los Angeles, Calif., a corporation of California Filed Apr. 1, 1963, Ser. No. 269,661
3 Claims. (Cl. 194—57)

This invention relates generally to vending machines and, more particularly, to a new and improved vending machine capable of issuing forms, such as insurance policies and the like, upon being conditioned to an operational state by a variable number of coins.

Vending machines of the type used for issuing accident insurance policies generally include means for receiving a number of coins of prescribed denomination, or a prescribed combinaion of coins of different denominations, to condition the machine to an operational state, whereby insurance policies may be issued in varying amounts corresponding to the number and combination of coins inserted. For auditing purposes, such machines usually also include means for retaining or reproducing a copy of each policy issued.

Vending machines of the aforementioned type generally embody an access window in the machine housing, so that the purchaser of a policy may insert on a blank policy form certain necessary identifying information. This window is normally sealed by a cover plate operably connected for opening and closing to an appropriate mechanism within the machine. This latter mechanism is, in turn, itself conditioned to an operative state by insertion of the required coins into the vending machine.

In filling out the required information upon an original policy form revealed through the open window of the machine housing, the information is usually reproduced upon a duplicate policy form by means of carbon backing provided on each of the original policy forms. The duplicate policy forms are of the same general dimensions as the original forms and are spaced directly behind corresponding original policy forms to provide a continuous double-layer web of policy forms passing beneath the machine housing window. Separate sources of supply, e.g., rolls, for the original and duplicate policy forms are usually provided within the machine, and the continuous web is generally fed through the machine by sprocket wheel drive mechanisms of well-known design.

After the customer has inscribed the required information upon the policy forms, he actuates a suitable mechanism which is provided for closing the window cover plate and delivering the original policy form to him. In this regard, an appropriate cutting mechanism may be provided within the machine for severing the original policy form from the continuous web so that it drops into a basket or other suitable receptacle for subsequent retrieval by the customer. The duplicate policy forms may or may not be cut from the stack but, in any event, are retained and restacked within the vending machine.

In the absence of provision of a receptacle for delivery of the policy to the customer, the completed policy sometimes falls to the floor if the customer has not been vigilant in grasping the policy as it is dispensed from the machine. On the other hand, where such delivery receptacles have been provided, and a single customer has purchased several policies in succession, the receptacle has been prone to being filled with policies to the point where it would block others from being dispensed by the machine and thereby cause a paper jam within the machine.

Unfortunately, a number of other mechanical difficulties have also been encountered with the form-issuing vending machines heretofore available. A primary difficulty has involved the handling of the paper web constituting the original and duplicate policy forms. In this regard, the devices heretofore employed have been subject to jamming of the feed mechanisms used for transporting the policy forms through the various sections of the machine. Moreover, the policy forms are sometimes subject to tearing by the paper handling mechanisms, especially by sprocket wheel devices adapted to engage corresponding sprocket holes along the longitudinal edges of the original and duplicate policy forms, as well as by the mechanisms used for separating and dispensing the policy forms from the continuous web.

Problems are also encountered with such vending machines in regard to jamming of the coin control mechanisms, i.e., the coin return and money box deposit mechanisms. Moreover, in form-issuing vending machines of the type which employ a drum for transporting the policy forms through the machine, complex and troublesome gear arrangements were required for rotating and indexing the drum to its various operating positions during cycling of the vending machine.

Additional problems confronting designers of insurance policy vending machines have included the high cost and complexity of manufacturing, as well as the lack of durability and extensive service requirements of the vending machine units. Moreover, those concerned with the development of such vending machines have sought machine designs which would be readily convertible from wholly mechanical operation to electrical motor driven operation.

Accordingly, it is one object of the present invention to provide a new and improved form-issuing vending machine which overcomes the above and other disadvantages of the prior art machines.

Another object is to provide a form-issuing vending machine which is characterized by simplicity of structural arrangement, ease of assembly and reduced cost of manufacture, minimum service requirements, and which is more positive and reliable in operation.

A further object of this invention is the provision of a form-issuing vending machine having an improved paper handling mechanism which minimizes the tendency of the paper to tear or bind within the machine.

Still another object is to provide a form-issuing vending machine having an improved cutting knife arrangement enabling more positive and timely separation of the customer's copy from a continuous web supply stack within the machine.

A still further object is to provide an improved paper guiding delivery means for forms issued by the vending machine so as to permit the sheared form to be conveniently detached by the operator.

Yet another object of the present invention is the provision of a vending machine having an improved drum-type paper transport mechanism possessing drive and indexing means of simpler and more reliable construction.

Another object is to provide an improved coin mechanism within a dispensing machine whereby the number of coins necessarily inserted for rendering the machine operative may be readily controlled, and the coin return and money box deposit mechanisms are more positive and reliable in their operation.

Still another object of the present invention is the provision of an improved vending machine design which is readily convertible from a purely mechanical drive arrangement to one which may be operated by an electrical motor.

A still further object is to provide a vending machine of the form-issuing variety which embodies an improved mechanism for providing necessary sequential operation of the various machine components.

The above and other objects and advantages of this invention will be better understood by reference to the following detailed description when considered in connection with the accompanying drawings of an illustrative embodiment thereof, wherein.

Figures 1, 2, 3:
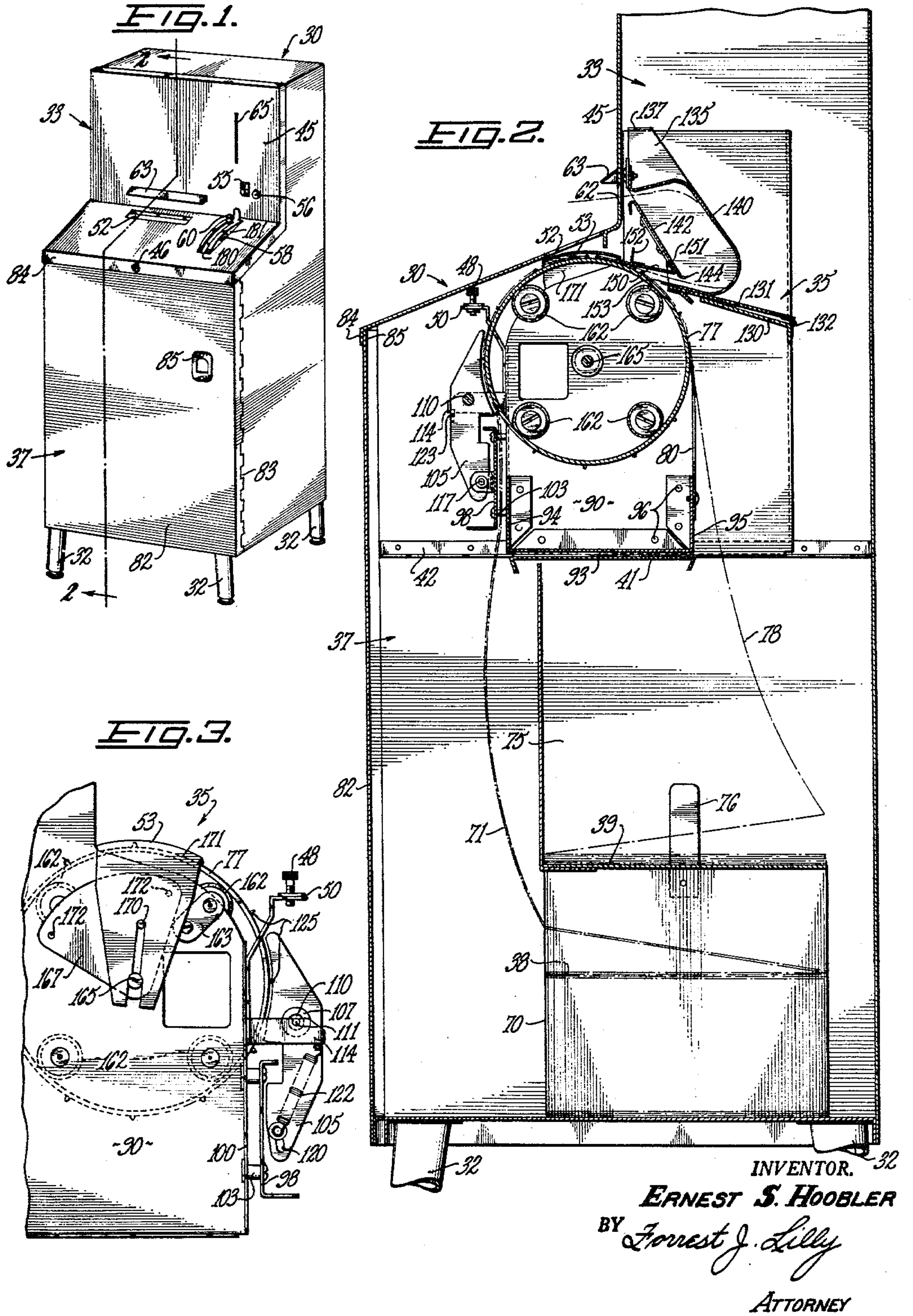
FIG. 1 is a perspective view of the cabinet which houses the form-issuing vending machine of the present invention.
FIG. 2 is a partial sectional view, taken along the line 2—2 of FIG. 1, and illustrates the paper-handling system of the vending machine.
Figure 4:
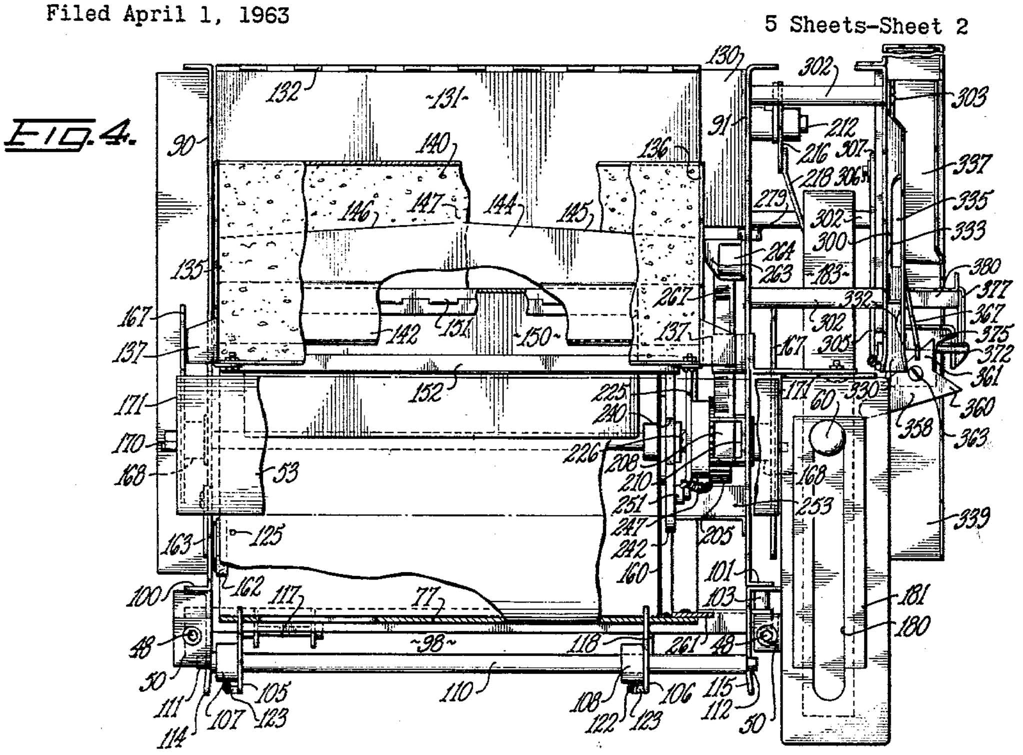
Figures 16, 17, 18:
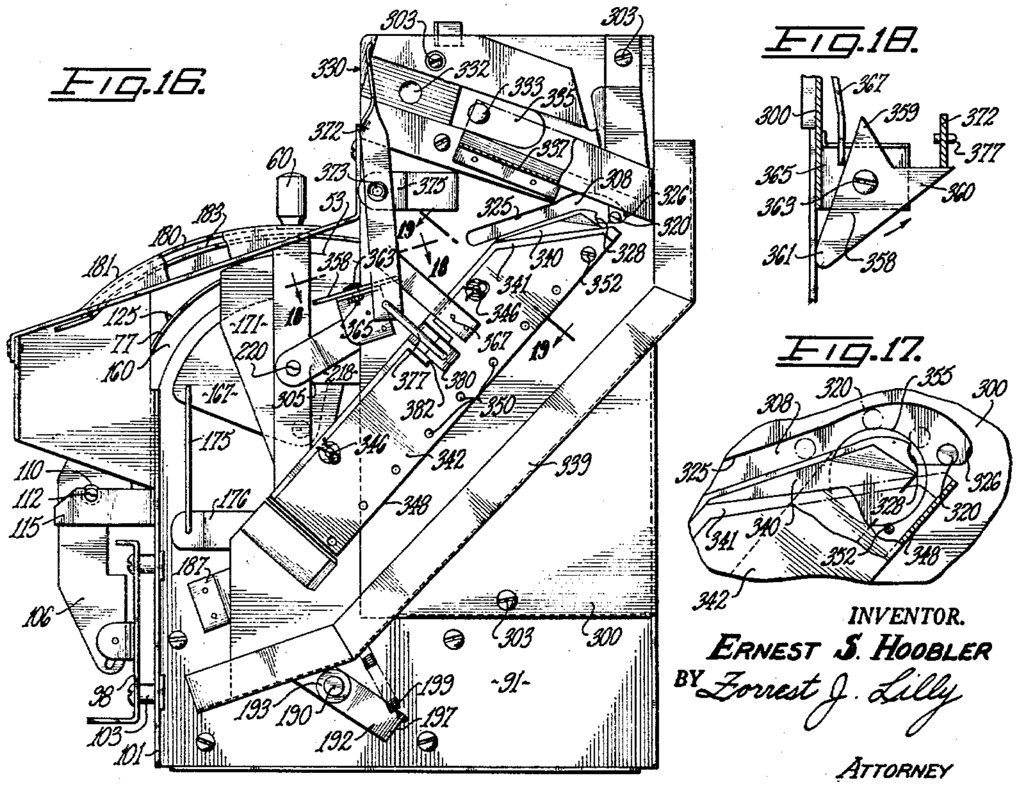
Figures 2A, 5, 15:
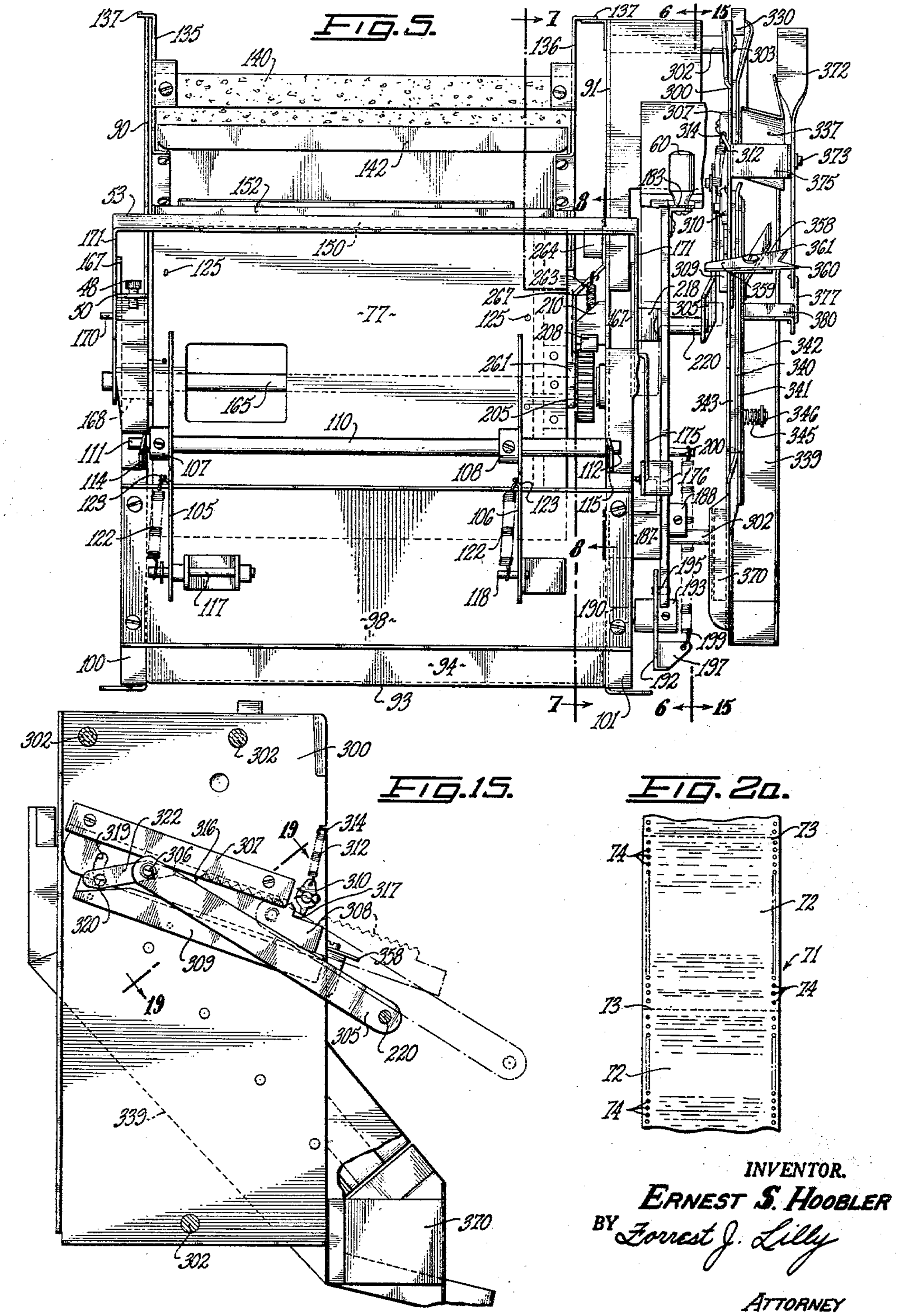
Figure 7:
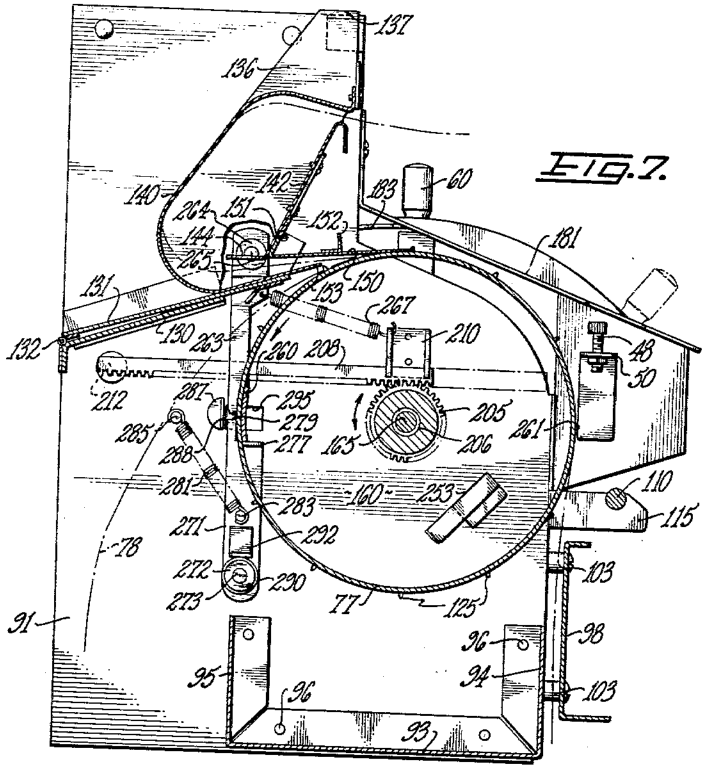
Figure 19:
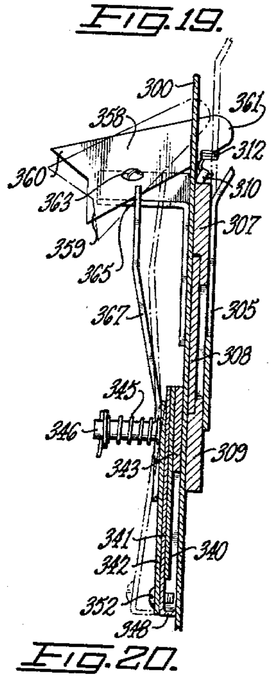
Figure 20:
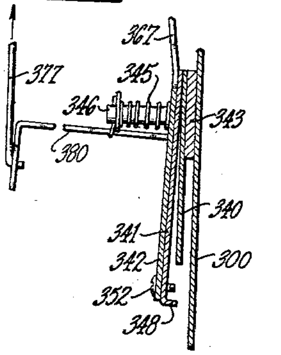
Figure 6:
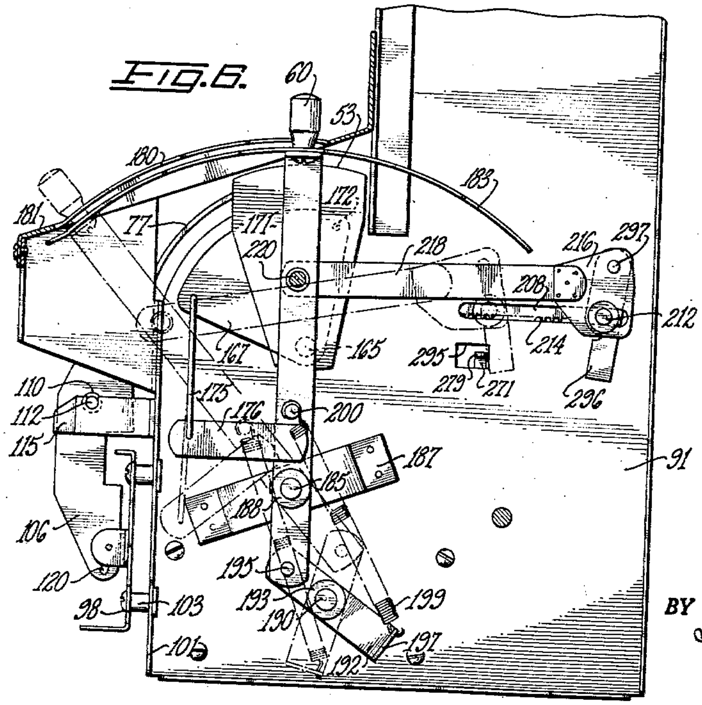
Figures 8, 10, 11:
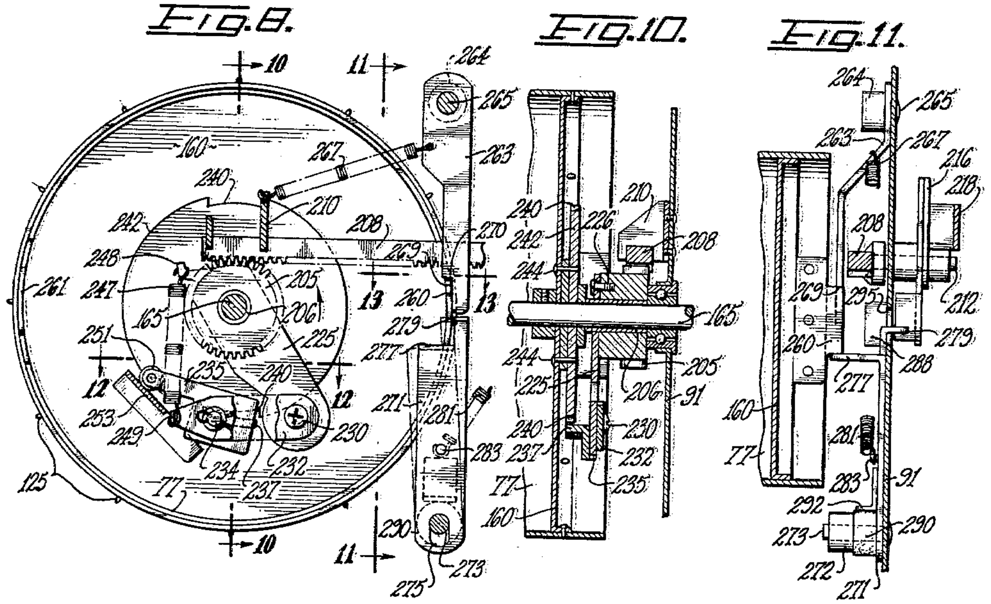
Figure 9:
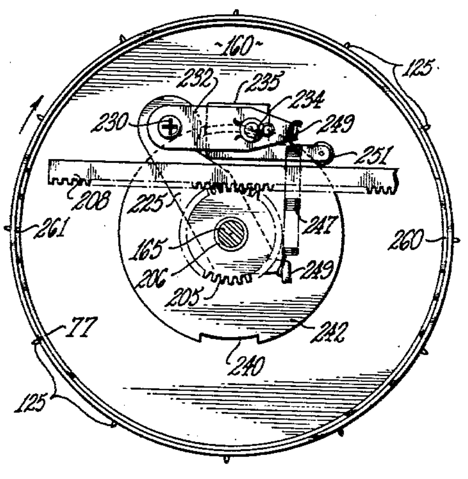
Figure 13:
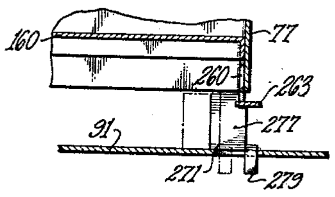
Figure 14:
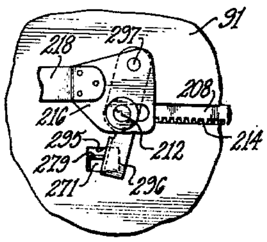
Figure 12:
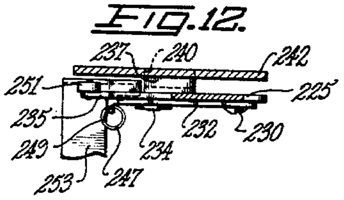

FIG. 2*a* is a partial front view of the continuous paper supply web which passes through the paper-handling system of FIG. 2;

FIG. 3 is a left side elevational view, with the cabinet removed, of the vending machine of the present invention; and illustrates portions of the paper-guiding mechanism, the cover plate actuating mechanism, and the means for supporting the drum which transports the paper from the supply stack to the return stack;

FIG. 4 is a top plan view, with the cabinet removed, of the vending mechine, portions being broken away to illustrate internal structure;

FIG. 5 is a front elevational view, with the cabinet removed, of the vending machine of the present invention, portions being broken away;

FIG. 6 is a sectional view, taken along the line 6—6 of FIG. 5, and illustrates some of the operating arm linkages of the vending machine, an intermediate position of the operating arm being shown in phantom;

FIGS. 7 and 8 are sectional views, taken along the lines 7—7 and 8—8, respectively, of FIG. 5, and illustrate portions of mechanism for driving and indexing the paper transport drum to its various operating positions during cycling of the vending machine;

FIG. 9 is a sectional view similar to FIG. 8, and shows the drum drive mechanism rotated to an operating position corresponding to a different phase of the vending machine cycle;

FIGS. 10 and 11 are sectional views, taken along the lines 10—10 and 11—11, respectively, of FIG. 8, and illustrate additional structural details of the drum drive and indexing arrangement;

FIG. 12 is a sectional view, taken along the line 12—12 of FIG. 8, and shows the means for deflecting the driving pawl out of engagement with the drum drive plate;

FIG. 13 is a partial sectional view, taken along the line 13—13 of FIG. 8, and illustrates the drum lock release mechanism;

FIG. 14 is a partial elevational view of the lower drum lock release mechanism in the release position and is a sequential view for the phantom position of the release mechanism shown in FIG. 6;

FIG. 15 is a sectional view, taken along the line 15—15 of FIG. 5, and illustrates the ratchet mechanism of the vending machine for insuring complete cycling of the machine following initiation of operation;

FIG. 16 is a right side elevational view, with the cabinet removed, of the vending machine of the present invention, and illustrates the coin control mechanisms;

FIG. 17 is an enlarged view of the general area 17 of FIG. 16, and illustrates the manner in which insertion of a prescribed number of coins conditions the vending machine to an operational state;

FIG. 18 is a sectional view, taken along the line 18—18 of FIG. 16, and illustrates the control cam which conditions the coin mechanisms of the vending machine;

FIG. 19 is a sectional view, taken along the line 19—19 of FIGS. 15 and 16, and illustrates the manner in which the control cam releases inserted coins to a money box when the vending machine operating arm is actuated; and FIG. 20 is a sectional view, similar to FIG. 19, illustrating the manner in which the coin mechanism may be actuated to accomplish coin return.

Referring now to the drawings, and particularly to FIGS. 1 and 2 thereof, there is shown an upright cabinet 30 which houses the new and improved vending machine of the present invention. The cabinet 30 is fabricated of a suitable structural material, such as steel or the like, and is supported in its upright position by a plurality of conventional legs 32 secured to the underside of the cabinet.

The cabinet 30 also includes an upper cabinet compartment 33, for supporting a vending machine unit 35, and a lower cabinet compartment 37, for supporting a paper supply stack 38 and a paper return stack 39.

The upper cabinet compartment 33 carries a horizontal shelf 41 secured between a pair of supporting rails 42 mounted upon the internal surface of each of the left and right side walls of the cabinet 30. The vending machine unit 35 is, in turn, mounted in any suitable manner upon the horizontal shelf 41.

A pivotal cover member 45 is provided upon the cabinet 30 for sealing the upper compartment 33. The cover 45 is provided with a suitable hinge arrangement (not shown) enabling the cover to be pivoted vertically about its upper end and thereby enable access to the upper compartment 33. A locking mechanism 46 is also included at the lower end of the cabinet cover 45 so that access to the upper compartment 33 may be denied to unauthorized personnel when the cover is in its normal position shown in FIG. 1.

The cover member 45 is accurately positioned with respect to the vending machine unit 35 by means of a pair of adjustable upright posts 48. The posts 48 are located at each side of the vending machine unit 35 and are adapted to be screwed into horizontal platforms 50 which extend from the vending machine unit. In this manner, the vertical height of the posts, and hence the spacing of the cabinet cover 45 in its closed position from the vending machine unit, may be readily adjusted.

The cabinet cover 45 further includes a window 52 which is selectively closed and opened by means of a cover plate 53 carried upon the vending machine unit 35. Upon actuation of the cover plate 53 to a position whereby the window 52 is opened, a portion of a policy form within the machine is revealed to the customer so that the customer may inscribe the required information upon the policy form.

The cabinet cover 45 is also provided with a coin insert slot 55 and a coin return button 56 which cooperate with an appropriate coin control mechanism within the vending machine unit 35. In this regard, an opening 58 is provided through which the operating arm portion of the vending machine unit 35 may project beyond the cover 45, so that, upon insertion of the prescribed number and type of coins through the slot 55, the customer can move the operating arm 60 to a position which actuates the cover plate 53 and thereby opens the window 52. Thereafter, the customer can return the operating arm 60 to the position shown in FIG. 1, and thereby cause the customer's copy of the insurance policy to issue through a dispensing opening 62 in the cabinet cover 45.

The cover 45 carries a shielding element 63 over the dispensing opening 62 to minimize the admission of dirt or other foreign matter into the machine through the dispensing opening. A long vertical slot 65 is also provided in the vertical face of the cabinet cover 45, and this slot may be used for mounting appropriate vending machine accessories (not shown), i.e., timing or coin control mechanisms, within the upper cabinet compartment 33.

The lower cabinet compartment 37 includes a chamber 70 for storing a supply stack 38 of folded original and duplicate policy forms. The original and duplicate policy forms in the supply stack 38 form a continuous paper web 71. Each duplicate policy form is directly behind a corresponding original form carrying a carbon backing, so that information written upon the original form will automatically be transferred to the underlying duplicate form. Moreover, as will be apparent from FIG. 2*a*, successive policy forms 72 along the web 71 are delineated from one another by a series of tear perforation rows 73 extending across the width of each form 72 and the web 71, so that a customer may separate the purchased policy from the remainder of the web. These tear perforations 73 also provide convenient fold lines along which the web 71 is folded to provide the supply stack 38.

Each of the policy forms 72 making up the web 71 is also provided with a continuous series of sprocket holes 74 along both longitudinal edges. These sprocket holes cooperate with the paper transport mechanism within the vending machine in a manner which will hereinafter become apparent.

Located directly above the chamber 70 is a duplicate copy storage chamber 75 for supporting the return stack 39 of duplicate policies. These duplicate policies carry required information concerning the policies issued by the vending machine, for auditing purposes.

The return stack 39 comprises a continuous single-layer paper return web 78 which is refolded in essentially the same manner as the original double-layer supply stack 38 was folded, but in reverse order. Hence, the duplicate policies are stored in the same sequence as the original policies are issued from the machine, thereby avoiding a random order storage distribution which might hamper the auditing process. To this end, a pair of vertical side members 76 are also provided within the chamber 75 to prevent sidewise displacement of the return stack 39 within the compartment 37.

As will be apparent from FIG. 2, the supply stack 38 unfolds to provide the continuous paper supply web 71 which emanates from an open front end of the chamber 70. This supply web 71 is directed upwards through the lower cabinet compartment 37 and enters the upper cabinet compartment 33 where it is engaged by a paper transport drum 77 in the vending machine unit 35.

Suitable mechanisms, which will hereinafter be described, are employed to separate the original policy forms from the duplicate policy forms of the supply web 71 at a suitable point along the drum 77 during cycling of the vending machine. The original policy forms from the supply web 71 are issued by the machine through the dispensing opening 62, whereas the duplicate policy forms continue as the return web 78 and are separated from the drum 77 by means of a pair of thin, flexible, paper guiding fingers 80. The fingers 80 are carried upon the frame of the vending machine unit behind the drum 77 and are interposed between the surface of the drum and the return web 78.

Once separated from the drum 77, the return web 78 is directed down through the upper compartment 33 and into the lower compartment 37. Here, the web 78 enters the upper storage chamber 75 and folds along the tear perforation rows 73 between successive duplicate policy forms 74 to form the return stack 39.

As shown in FIGS. 1 and 2, a door 82 is provided to seal the forward end of the compartments 33 and 37 in the cabinet 30. To this end, the door 82 is hinged at 83 for pivotal movement, so that the door may be swung open for replenishment of the supply stack 38 and removal of the return stack 39. The door 82 is maintained in its closed position by the same locking mechanism 46 which maintains the cabinet cover 45 in its closed position. In this regard, the forward end 84 of the cabinet cover 45 overlaps the upper end 85 of the door 82. Hence, the door 82 cannot be opened without first unlocking and raising the cabinet cover 45.

Also carried upon the door 82 is a coin return receptacle 85, of conventional design. The receptacle 85 cooperates with a suitable coin return mechanism within the vending machine unit 35 to receive returned coins, when the coin return button 56 is depressed.

The vending machine unit 35 supports the paper transport drum 77 between a pair of vertical side plates 90, 91, one at each side of the vending machine (see FIGS. 2, 3, 4). A base plate 93, having vertically extending forward and rear side flanges 94, 95, respectively (see FIGS. 2 and 7), is also secured by any suitable means, as by the screws 96, between the vertical side plates 90, 91. The flexible paper guiding fingers 80 are secured to the rear flange 95 of the base plate 93.

A forward wall channel member 98 spans the distance between the side plates 90, 91 and is secured to flanged portions 100, 101, respectively, of the side plates and spaced therefrom by the screw and spacer assemblies 103 (see FIGS. 3–5).

As best observed in FIGS. 2–5, a pair of paper bail members 105, 106 are employed to guide the supply web 71 onto the paper transport drum 77 as the paper passes behind the channel member 98 from the lower cabinet compartment 37. The bail members 105, 106 are carried upon a cylindrical supporting shaft 110. In this regard, the bail members carry integral locking collars 107, 108, respectively, which secure the bail members in their respective positions along the shaft 110. The shaft 110 is provided with ends 111, 112 of reduced diameter which are adapted to seat in corresponding slots provided in a pair of brackets 114, 115 extending from the side plate flanges 100, 101, respectively.

A pair of shafts 117, 118 are carried by appropriate brackets secured to the channel member 98. These shafts are adapted to engage elongated slots 120 provided in the lower ends of each of the bail members 105, 106. A pair of springs 122, one for each of the bail members 105, 106, have their lower ends secured to the shafts 117, 118, respectively, and their upper ends secured to tabs 123 extending from upper portions of the bail members.

In loading the continuous web 71 onto the drum 77, the shaft 110 and bail members 105, 106 are lifted upwardly against the forces of the springs 122. The shafts 117, 118 ride in the elongated slots 120 at the lower end of each of the bail members and, therefore, the entire bail assembly swings up and out to a position free of the brackets 114, 115.

With the bail assembly thus positioned, the supply web 71 may be readily loaded upon the paper transport drum 77. To this end, a plurality of pins 125 (see FIGS. 3 and 5) are provided along the circumference of the drum 77, at both ends thereof, to engage the paper supply web 71 by means of the sprocket holes 74 provided along both longitudinal edges of the web. Once the paper supply web 71 has been loaded upon the paper transport drum 77, the bail assembly may be returned to the position shown in FIG. 3, whereby the bail members 105, 106 hold the supply web against the drum so that the web will not become disengaged from the pins 125.

Referring now particularly to FIGS. 2, 4, 5 and 7, that portion of the paper handling system for separating the return web 78 from the supply web 71 and issuing the customer's copies through the dispensing opening 62 is next described.

A supporting bracket 130 is held between the side plates 90, 91. A base plate 131 for the upper paper guide and dispensing assembly rests upon the supporting bracket 130 and is pivotally secured thereto by the hinge 132. A pair of vertical side plates 135, 136 extend from the base plate 131 and, together therewith, provide a supporting framework for the guide and dispensing assembly. Moreover, the side plates 135, 136 are provided with horizontally extending tabs 137 at their upper ends, these tabs being adapted to overlap the upper ends of the vending machine side plates 90, 91 and thereby space the entire guide and dispensing assembly from the paper transport drum 77.

A curved guide plate 140 is secured to the base plate 131 and the side plates 135, 136. The inner surface of the guide plate 140 directs the customer's copy along an exit path from the drum 77 out through the paper dispensing opening 62. To this end, the surfaces of the guide plate 140 are embossed, i.e., provided with an irregular crinkled finish (see FIG. 4), so that a number of small air pockets will exist between the inner surface of the guide plate and the form being dispensed. This arrangement minimizes the tendency for the paper to adhere to the guide plate surfaces, and thereby enhances the efficiency of the dispensing process by minimizing the possibility of a paper jam.

A knife 142 is also secured by any suitable means between the side plates 135, 136. In this regard, the upper ends of the guide plate 140 and knife 142 are spaced apart to provide an appropriate exit for the form being issued, so that the form will pass through the dispensing opening 62 in the cabinet 30 when the vending machine unit 35 is installed within the cabinet.

The lower end of the knife 142 is bent to define a horizontally extending knife blade 144. As best seen in FIG. 4, the knife blade 144 is provided with a pair of leading edges 145, 146 which taper slightly from the sides of the blade to a forwardly extending central apex carrying a small pointed tooth 147.

The shape of the knife blade 144 shown in FIG. 4 renders the knife extremely effective in severing individual policy forms from the paper supply web 71 with minimal possibility of undesired tearing. In this regard, conventional policy forms which embody transverse tear perforations are usually separated from a web by starting the tear from along one edge of the web. Unfortunately, this often results in the tear line veering off the perforation line, with consequent damage to the policy forms. Moreover, to accurately and reliably initiate a tear from along one edge, the tearing forces generally must be applied parallel to the desired tear line.

However, with the knife blade 144 of the present invention, the aforedescribed difficulties are substantially eliminated. To this end, the central tooth 147 pierces the tear perforation line 73 between adjacent policy forms midway between the longitudinal edges of the web. Hence, when the customer exerts a force upon the form being issued which is perpendicular to the perforation line 73, the form separates from the web 71 first along its center, the separation thereafter progressing gradually outward along the tear perforation line to the longitudinal edges of the web. This outward progression of the tear from the center of the perforation line 73 is effected by the slight taper of the leading edges 145, 146 as the paper is pulled across the knife blade 144.

A paper retainer plate 150 is also provided to hold the web 71 securely against the drum 77 adjacent the entrance to the paper guide and dispensing assembly. The paper retainer plate 150 is hinged at 151 to the knife 142 and may thereby be pivoted vertically away from the drum 77 during loading of the paper supply web 71 upon the drum. The paper retainer plate 150 also carries a vertical flange 152 which extends substantially the full width of the drum 77. The flange 152 acts as a limit stop for the cover plate 53 when the latter is in its closed position.

In using the paper guide and dispensing assembly, paper retainer plate 150 is first pivoted upwardly. The web of original policy forms, which forms the upper layer of the continuous paper web 71, is then directed over a lower lip 153 of the guide plate 140 and into the mouth of the guide and dispensing assembly. On the other hand, the duplicate policy forms, which make up the return web 78, pass under the lip 153 and are subsequently separated from the drum 77 by the flexible fingers 80. The return web 78 is then directed to the lower cabinet compartment 37 where it folds for storage within the chamber 75. Upon positioning the two layers of the supply web 71 in the aforedescribed manner, the paper retainer plate 150 is allowed to pivot downwardly and contact the supply web, to hold the web against the drum 77 and prevent it from disengaging the pins 125.

The cylindrical paper transport drum 77 is open at its left end and is sealed at its right end by a closure plate 160 (see FIG. 4). The closure plate 160 is secured to the inner wall surfaces of the drum 77 by any well-known means, such as riveting, welding or the like. The drum 77 is supported at its open left end by a plurality of rubber wheels 162 (see FIGS. 2 and 3) carried upon the vending machine side plate 90 by appropriate mounting brackets 163. The rubber rollers 162 abut the inner periphery of the drum 77 and thereby support the drum for rotation.

A central shaft 165 is coaxial with the cylindrical axis of the drum 77 and extends through both vending machine side plates 90, 91. At the right end of the drum 77, the shaft 165 extends through an opening in the closure plate 160 (see FIGS. 4, 5 and 10) to provide support for this end of the drum. The shaft 165 is journaled for rotation in appropriate bearings carried upon the side plates 90, 91 and is free to rotate both with respect to these side plates and the drum 77 as well.

A pair of triangular or sector-like actuator plates 167 are secured by locking collars 168, integral with the actuator plates, to the ends of the shaft 165 which protrude beyond the vending machine side plates 90, 91. The actuator plates 167 support the cover plate 53, and may be used interchangeably with one another at either end of the shaft 165. Each actuator plate 167 carries a guide pin 170 extending from its outer face and adapted to engage one of a pair of legs 171 of the cover plate 53. To this end, the legs 171 of the cover plate 53 are provided with elongated slots of appropriate cross-section for engaging the shaft 165 and guide pins 170 to mount the cover plate upon the actuator plates 167.

Each actuator plate 167 is also provided with holes 172 (see FIGS. 3 and 6). The actuator plate 167 adjacent the vending machine side plate 91 is connected to the operating arm 60 by means of a linkage 175 which is coupled at one end to the actuator plate 167 by passing through one of the holes 172. The other end of the linkage 175 is coupled to an arm 176 which is fixedly secured to and extends from the operating arm 60. Hence, when the operating arm 60 is pivoted between the solid and phantom positions shown in FIG. 6, the right actuator plate 167 is also caused to pivot. Since the right actuator plate 167 is secured by its integral locking collar 168 to the shaft 165, the shaft rotates when the actuator plate is pivoted. Rotation of the shaft 165, in turn, causes the left actuator plate 167 to also pivot in the same manner as the right actuator plate. This pivoting of the actuator plates 167, when the operating arm 60 is moved, causes the cover plate 53 to move between its closed and open positions for selectively revealing to a customer portions of the policy forms in the web 71.

The operating arm 60 provides the means by which the customer causes the vending machine unit 35 to perform its cycle of sequential operations. The operating arm 60, therefore, is the main operating lever of the machine. As will be observed in FIGS. 4–6, the upper end of the operating arm 60 extends, by way of its handle, through an elongated clearance slot 180 in a face plate 181. The slot 180 is of sufficient length to provide clearance for the operating arm 60 over its entire range of movement during operation of the machine.

To prevent access to the interior of the vending machine unit 35 through the clearance slot 180, an arcuate shielding plate 183 is secured to the operating arm 60 and moves with the operating arm beneath the face plate 181. The arcuate length of the shielding plate 183 is such that the clearance slot 180 is sealed by the shielding plate against entry regardless of the position of the operating arm.

The operating arm 60 pivots about a fixed shaft 185 extending through the lower end of the arm. To this end, the shaft 185 is fixedly secured to a bracket 187 (see FIGS. 5 and 6) which is, in turn, integral with or appropriately mounted upon the vending machine side plate 91. A locking collar 188 maintains the operating arm 60 upon the shaft 185 between the locking collar and the bracket 187.

To properly cycle the vending machine, it is important that the operating arm 60 be pivoted over its complete range of motion between the solid and phantom positions shown in FIG. 6. Hence, means are provided for insuring positive seating of the operating arm 60 in these two extreme positions. To this end, a fixedly secured shaft 190 extends from the lower portion of the vending machine side plate 91 and passes through a pivotal arm 192 which is held upon the shaft between a pair of locking collars 193. The upper end of the arm 192 is pivotally secured to the lower end of the operating arm 60 by means of a pin 195. The lower end of the arm 192 is provided with a flange 197 coupled to one end of a coil spring 199. The opposite end of the spring 199 is attached to a post 200 integral with and extending from the operating arm 60.

The operation of the aforedescribed arrangement for aiding in completion of operating arm strokes, i.e., biasing the operating arm 60 to its extreme positions, is apparent from FIG. 6. When the operating arm 60 is in its solid position in FIG. 6, the ends of the spring 199 are positioned by the arm 192 and operating arm 60 so that the restoring forces of the spring tend to maintain the operating arm in that position. However, when the operating arm is pivoted about the shaft 185 by the customer, and passes through the mean position between the solid and phantom positions in FIG. 6, the spring 199 is repositioned by the operating arm 60 and arm 192 (note the phantom positions of elements 60, 192, 199) so that the restoring forces of the spring tend to drive and maintain the operating arm in the extreme phantom position. Hence, the pivotal arm 192 and operating arm 60 cooperate to position the spring 199 such that the restoring forces of the spring always tend to drive the operating arm to the nearer of its two extreme positions. Therefore, an effective means is provided for insuring that the operating arm is accurately moved over its entire range of pivotal motion for proper cycling of the vending machine.

It will also be apparent from FIG. 6 that, since the only requisite imposed upon the customer, insofar as causing proper cycling, is that the operating arm 60 be pivoted between its extreme positions about the shaft 185, the vending machine lends itself readily adaptable to operation by an electrical motor (not shown) rather than being manually operated by the customer. To this end, the output shaft of an electrically reversible motor could be coupled to the operating arm 60 to rotate the arm about the shaft 185. Suitable microswitches (not shown), e.g., of the type which are push-button actuated by the customer or actuated by insertion of the proper coins into the machine, may be used to energize and reverse the direction of rotation of the motor. Hence, the vending machine design of the present invention is readily adaptable to either wholly mechanical or motorized operation.

The manner in which the paper transport drum 77 is rotatably driven and indexed to its various operating positions is next described.

Referring now particularly to FIGS. 4, 5, 7 and 10, a pinion gear 205 is seated upon a sleeve bearing 206 carried by the shaft 165, and the pinion is thereby adapted to rotate about the shaft 165 as a central axis. The teeth of the pinion 205 mate with the teeth of a longitudinally movable rack bar 208 which is maintained in driving engagement with the pinion by a rack guide bracket 210 mounted just above the pinion upon the vending machine side plate 91.

The distal end of the rack 208 carries an integral post 212 extending therefrom. The post 212 passes through and is adapted to ride along an elongated slot 214 in the vending machine side plate 91. The length of the slot 214 is sufficient to provide clearance for the post 212 over the entire range of movement of the rack 208 past the pinion 205. The post 212 is connected by a pair of locking collars to a tab 216 on the opposite side of the side plate 91 from that adjacent the rack 208. The tab 216 is, in turn, fixed to one end of a linkage bar 218. The other end of the bar 218 is pivotally coupled to the operating arm 60 by a post 220 which passes through the bar and is fixedly secured to the operating arm. Hence, when the operating arm 60 is moved from its solid position to its phantom position in FIGS. 6 and 7, the linkage bar 218 and tab 216 drive the rack 208, via the connecting post 212, between the solid and phantom positions of the rack shown in FIG. 7. Hence, during a complete cycling of the vending machine, the rack 208 rotates the pinion 205 first clockwise and then counterclockwise as viewed in FIG. 7.

Referring now more particularly to FIGS. 4 and 8–10, an arm 225 is secured by any suitable fastening means, such as a screw 226, to the end face of the pinion 205 nearest the drum 77. Consequently, the arm 225 rotates with the pinion 205 about the shaft 165. The end of the arm 225 farthest from the shaft 165 is pivotally connected at 230 to a second arm 232 which, in turn, is pivotally connected at 234 to an arm 235. An arcuate pawl 237 extends from the arm 235 and is adapted to selectively and succcessively engage peripheral slots 240 in a drum drive plate 242.

The drum drive plate 242 is fixedly secured to the drum closure plate 160 by any well-known means, as by the rivets 244. The pair of peripheral slots 240 in the drum drive plate 242 are diametrically opposed to each other along the circumference of the drive plate and, when the operating arm 60 is in either of its two extreme positions or in the process of being moved from its solid position to its phantom position in FIG. 6, the slots 240 are positioned one above the other as shown in FIGS. 8–10.

A spring 247 is connected between the arms 225 and 232 by having its ends attached to appropriate hook elements 248, 249, respectively, projecting from these arms. The restoring forces of the spring 247 bias the pawl 237 against the circumference of the drum drive plate 242, so that the pawl will engage the upper peripheral slot 240 when the pawl is rotated to its position shown in FIG. 9.

As best observed in FIGS. 4, 8 and 12, the end of arm 235 remote from the pawl 237 carries a roller 251. With the pawl 237 in its lowermost position shown in FIG. 8, the roller 251 engages a deflecting platform 253 which is welded or otherwise affixed to the vending machine side plate 91. When the roller 251 engages the platform 253, the arm 235 is pivoted about the axis 234 so that the pawl 237 is tilted free of the lower peripheral slot 240 in the drum drive plate 242. Hence, with the operating arm 60 in its uppermost position and the rack 208 in its most retracted position, the pawl 237 is pivoted out of driving engagement with the drum drive plate 242 by virtue of the contact between the roller 251 and the platform 253.

When the operating arm 60 is brought to its lowermost position, and the rack 208 is thus extended, the pinion 205 is rotated 180°. However, since the pinion 205 rotates free of the drum 77, and the pawl 237 does not engage the slot 240 of the drum drive plate 242 when the pawl is in its lowermost position, the arm 225 and linkage elements connecting this arm to the pawl 237 rotate with the pinion without driving the drum. Hence, in moving the operating arm 60 from its uppermost position to its lowermost position, the paper transport drum 77 remains stationary. However, the cover plate 53 is moved to the open position during this portion of the machine cycle, so that the customer can inscribe the required information upon the policy forms carried by the drum.

As shown in FIG. 9, when the arm 225 is rotated with the pinion 205 to its upper position, the pawl 237 engages the upper peripheral slot 240 of the drum drive plate 242. Hence, when the operating arm 60 is returned by the customer from its lowermost position to its uppermost position, not only does the cover plate 53 return to the closed position, but the drum 77 is also rotated 180° by virtue of the driving engagement between the pawl 237 and the drive plate slot 240 as the pawl is returned to its lowermost position in FIG. 8. Therefore, it will be apparent that the pawl 237 can drive the drum 77 only when it engages an upper drum drive plate slot 240. In the lower pawl position, the pawl cannot drivingly engage a drive plate slot due to the cooperation between the roller 251 and platform 253 in overcoming the biasing forces of the spring 247 to tilt the pawl carrying arm 235. Hence, only the return stroke of the operating arm 60, from its phantom position to its solid position in FIG. 6, accomplishes rotation of the drum 77 and thereby advances the drum 180°. Rotation of the drum causes the customer's copy of the policy to be issued from the vending machine and a fresh set of policy forms to be moved into position under the cover plate 53.

To further restrain the drum 77 against rotation at all times other than during the return stroke of the operating arm 60, a pair of drum locks are provided to hold the drum in a stationary position until released by suitable actuating mechanisms. To this end, the drum 77 carries a pair of lock plate extensions 260, 261 which are fixedly secured, as by riveting or the like, to the internal surface of the drum at its right end, so that the extensions project beyond the end of the drum (see FIGS. 4, 5, 11 and 13).

An upper drum lock 263 is pivotally secured by a locking collar 264 to a shaft 265 integral with and extending from the vending machine side plate 91. A spring 267 has one end attached to the rack guide 210 and the other end attached to the lock 263 near its pivot point, whereby the lock is biased by the spring towards the drum 77 At the lower end of the lock 263, the edge nearest the lock plate extension 260 is cut away or grooved to provide a reception slot 269 for the extension. It will be apparent in FIGS. 7 and 8 that, in rotating the drum 77 in the direction of the arrows, the lock plate extensions will always first encounter the wider portion of the lock 263 and thereby pivot the lock about the shaft 265 to enable the extension to enter the slot 269. After one of the extensions 260, 261 has passed the wider portion of the lock 263, the spring 267 returns the lock to its normal position shown in FIGS. 7 and 8, whereby the extension seats more positively in the slot 269. Once a lock plate extension has thus engaged the slot 269, reversal of the direction of rotation of the drum is prevented by the upper shoulder 270 of the slot which swings behind and abuts the lock plate extension.

A lower drum lock 271 is pivotally connected at its lower end by a locking collar 272 to a shaft 273 which is fixedly secured to and extends from the vending machine side plate 91. The shaft 273 is coupled to the lower end of the lock 271 through an elongated slot 275, so that the lock can move vertically with respect to the shaft 273 as well as pivot about the shaft.

The upper end of the drum lock 271 is bent to define a pair of oppositely extending horizontal flanges 277 and 279. The flange 277 is normally positioned so that it will engage the leading edge of one of the lock plate extensions 260, 261 as the drum 77 is rotated and thereby prevent further rotation of the drum. To maintain the drum lock 271 in a position whereby the flange 277 will be interposed in the path of rotation of the extensions 260, 261, a spring 281 couples the drum lock at 283 to a post 285 carried upon the side plate 91 (see FIGS. 7 and 8). The spring 281 biases the lower drum lock 271 to the proper position for blocking the drum extensions 260, 261. A bracket 287, carrying a vertical flange 288, is mounted upon the side plate 91 to limit the rearward movement of the drum lock 271 due to the pull exerted on the drum lock by the spring 281.

When the horizontal flange 277 of the drum lock 271 is engaged by a lock plate extension 260, as shown in FIG. 8, the lock is moved to its lowermost position with the shaft 273 abutting the upper end of the elongated slot 275. To avoid undue stress upon the shaft 273 when the drum lock 271 is suddenly forced downward by one of the lock plate extensions, a resilient roller 290 is carried upon the shaft between the locking collar 272 and the drum lock. A short, horizontal flange 292 is affixed to the lower end of the drum lock 271 and is adapted to engage the resilient roller 290, thereby minimizing transmission of mechanical shock to the shaft 273 and the lock when the lock is driven downward.

The manner in which the lower drum lock 271 is released to free the drum 77 for rotation at the appropriate moment during cycling of the vending machine is best observed in FIGS. 6, 13 and 15. To this end, the flange 279 of the drum lock 271 projects through an opening 295 in the vending machine side plate 91 to provide a trigger for releasing the drum lock and freeing the drum.

It will be noted in FIG. 6 that the coupling shaft 212 of the rack 208 is adapted to ride in a horizontally extending elongated slot 292 in the tab 216. Moreover, the shaft 212 passes through a trip-lever 296 which is also pivotally connected by a pin 297 to the tab 216.

The sequence of physical orientations assumed by the trip-lever 296 during cycling of the vending machine is shown by the solid and phantom positions in FIGS. 6 and 14. Initially, with the operating arm 60 in its uppermost position, the trip-lever 296 is in the positon shown in solid lines in FIG. 6. In moving the operating arm 60 from its uppermost to its lowermost positions, the shaft 212 rests against the rear surface of the slot 292 in the tab 216, and thereby pivots the trip-lever 296 to the position shown in phantom in FIG. 6. In this latter position, the lower leg of the trip-lever 296 barely contacts the flange 279 of the lower drum lock 271. However, in beginning the return stroke of the operating arm 60, the shaft 212 moves to and abuts the forward surface of the slot 292, and thereby causes the trip-lever 296 to pivot to the position shown in FIG. 14. In so doing, the lower leg of the trip-lever 296 shifts the flange 279 to the left (see FIGS. 8, 13 and 14).

When the flange 279 is moved to the left, the horizontal flange 277 of the drum lock 271 is pivoted free of the lock plate extension 260. As soon as the flange 277 is free of the extension, no force remains to overcome the spring 281 and maintain the drum lock 271 in its lowermost position. Therefore, the drum lock 271 rises, under the influence of the spring 281, and causes the right side of the flange 277 to rest against the inner surface of the lock plate extension 260, away from the leading edge of the extension. Hence, once the drum lock 271 has been released by the trip-lever 296, the flange 277 cannot return to its position of interference with rotation of the extension 260. Movement of the lower leg of the trip-lever 296 away from the flange 279, by movement of the operating arm 60 away from its lowermost position, does not relock the drum 77 until the machine cycle has been completed and the lock plate extension 261 assumes the position formerly occupied by extension 260 in FIG. 8.

Referring now particularly to FIGS. 4, 5, 15 and 16, the vending machine unit 35 is provided with an auxiliary vertical side plate 300 which is secured to the vending machine side plate 91 in parallel spaced relationship by a plurality of upper and lower connection posts 302 extending from the side plate 91. The connection posts 302 are fastened to the side plate 300 by any well-known means, such as the screws 303. All of the coin control mechanisms of the vending machine unit 35 are mounted upon the auxiliary side plate 300.

Means must be provided for insuring that the operating arm 60 cannot have the direction of its stroke reversed from any position between its extreme uppermost and lowermost positions. Otherwise, the drum would be susceptible to "pumping," whereby its direction of rotation could be reversed from intermediate positions of the operating arm, with the consequent possibility of moving the paper web 71 out of alignment with the upper paper guide and dispensing assembly. The latter misalignment could occur if a policy were issued from the machine and the drum 77 were subsequently reversed in direction of rotation. The leading edge of the top layer of the web 71 upon the drum might then become disengaged from the lower lip 153 of the guide plate 140 and from the paper retainer plate 150. In this event, subsequent proper operation of the vending machine would not cause the customer's copies of purchased policies to issue through the dispensing opening 62. Rather, the web 71 would either pile up and jam at the leading edge of the paper retainer plate 150, or would be carried around the drum 77 with the return web 78 in FIG. 2.

A ratchet and pawl arrangement (see FIG. 15) is provided for preventing reversal of the direction of pivotal movement of the operating arm 60 during its initial and return strokes. To this end, a coupling linkage 305 is pivotally connected at one end to the shaft 220 passing through the operating arm 60, and the linkage is connected at its opposite end to a pin 306 secured to a ratchet bar 308. The ratchet bar 308 is held against the auxiliary side plate 300 by upper and lower guide plates 307, 309, respectively, which are suitably secured to the side plate. The ratchet bar 308 is thereby adapted to slide between the guide plates 307, 309 and the auxiliary side plate 300 between the solid and phantom positions shown in FIG. 15. These solid and phantom positions of the ratchet bar 308 correspond to the extreme upper and lower positions, respectively, of the operating arm 60 which is coupled to the ratchet bar by the linkage 305.

A pawl 310 is pivotally mounted upon the side plate 300 adjacent the teeth-bearing side of the ratchet bar 308. A spring 312 has one end coupled to the pawl 310 and its opposite end fastened to a tab 314 projecting from the side plate 300. The spring 312 serves to bias the pawl 310 to a position whereby it engages the teeth of the ratchet bar 308.

A pair of pawl clearance slots 316, 317 are provided in the side of the ratchet bar 308 at each end of the row of ratchet teeth. Hence, when the operating arm 60 is in either of its two extreme positions, the pawl 310 will engage one of the clearance slots 316, 317 to enable reversal of the direction of longitudinal movement of the ratchet bar 308 and thereby enable reversal of the direction of pivotal movement of the operating arm. However, in any intermediate position between the clearance slots 316, 317, the pawl 310 engages the teeth of the ratchet bar 308 in a manner which prevents reversal of the direction of movement of both the operating arm and the ratchet bar.

It will be noted in FIG. 15 that the distal end of the ratchet bar 308 is provided with a slot 319 in which a pin 320 extending from one end of a dog 322 is adapted to ride. The opposite end of the dog 322 is pivotally connected by the pin 306 to the ratchet bar 308 and the coupling linkage 305.

As best seen in FIG. 16 and 17, the pin 320 of the dog 322 extends not only through the slot 319 in the ratchet bar 308 but also extends through an elongated slot 325 in the auxiliary side plate 300. The slot 325 is of sufficient length to provide clearance for the pin 320 over the entire range of longitudinal movement of the ratchet bar 308.

The slot 325 is turned downward at its rear to provide a recessed portion 326 for the pin 320. The recess 326 includes a slightly concave shoulder 328 adapted to engage the pin 320 as the ratchet bar 308 moves forward. Hence, the shoulder 328 restrains the ratchet bar 308 and operating arm 60 against movement until the pin 320 is vertically deflected clear of the recess 326 by a suitable coin control mechanism hereinafter subsequently described.

The aforedescribed locking arrangement points out an additional function of the ratchet and pawl arrangement 308, 310, inasmuch as release of the pin 320 and movement of the operating arm 60 away from its uppermost position serves to deposit inserted coins into a money box. Therefore, if the operating arm 60 were capable of reversal in direction of movement before completion of its initial stroke, the money would be deposited, and the machine would relock, without issuing any policy to the customer. Hence, the ratchet and pawl arrangement provides a safeguard to the customer for preventing the operating arm 60 from reversing its direction of movement until completion of the proper cycling strokes, whereby a policy must be issued by the vending machine unit if the proper coins are inserted by the customer.

The coin control mechanisms for receiving, depositing, or returning money by the machine, as well as for unlocking the machine by deflecting the pin 320 of the dog 322 free of the recess 326 and shoulder 328, are next described with reference to FIGS. 4, 5 and 15–20 of the drawings.

When coins are inserted into the vending machine through the slot 55 of the cabinet 30 shown in FIG. 1, they enter a channel 330 adjacent the upper end of the auxiliary side plate 300 (see FIGS. 4, 5 and 16). The channel 330 includes a pair of inwardly directed bosses 332, 333 which prevent the entry of coins of excessive width. If coins of narrower width and smaller diameter than those required to operate the machine are inserted into the channel 330, the second boss 333 will deflect such coins to the side of the channel opposite the auxiliary side plate 300. To this end, a wide slot 335 (see FIG. 16) is provided in the latter side of the channel 330, adjacent the boss 333, to permit such undersized coins to be deflected out of the channel and into a drop-out trough 337. The trough 337 leads into a coin return chute 339 which communicates with the coin return receptacle 85 of the cabinet 30 in FIG. 1.

When coins of proper denomination are inserted into the channel 330, they pass to the rear of the channel and drop vertically into a special guideway provided for receipt of the coins. The latter guideway for the coins is formed by a plurality of longitudinally coextensive plates 340–342 which are spaced from the auxiliary side plate 300 by a spacer bar 343. The plates 340–342 are spring loaded against the spacer bar 343 by a plurality of springs 345 carried upon posts 346 integrally secured to the plate 300 and extending through each of the elements 340–343 (see FIGS. 16, 19 and 20).

As coins of proper denomination drop from the rear of the channel 330, they enter the space between the plate 340 and the side plate 300 (see FIGS. 17 and 19). To maintain the coins in the space between the plates 340 and 300, and prevent the coins from dropping vertically out of the guideway, the plate 341 is provided with a right-angle flange 348 which, in its normal position, rests against the plate 300 and seals the lower end of the guideway along its length.

The plates 341 and 342 are both provided with a series of spaced, aligned holes 350 along essentially the full length of their lower longitudinal edges. A screw or pin member 352 may be selectively inserted through any of the holes 350 and essentially spans the width of the space between the plates 341 and 300. The coin guideway may thereby be blocked to the passage of coins at a selected point along the guideway in accordance with the selection of the hole 350 through which the pin member 352 is inserted. To this end, the holes 350 are spaced apart at intervals corresponding to rows of coins of different length, the difference in row lengths between successive hole positions being equal to the diameter of a single coin of proper denomination for operating the vending machine. Hence, it will be apparent that means (not shown) may be provided for selectively varying the position of the pin member 352 within the holes 350, whereby the number of coins required for operating the machine may be altered in accordance with the denomination of the policy to be issued by the machine.

The manner in which the coin guideway cooperates with the pin 320 of the dog 322 to unlock the ratchet bar 308 and operating arm 60 is illustrated in FIG. 17. Upon placing the pin member 352 into a selected hole 350 corresponding to a desired coin row length, insertion of the proper number of coins positions the last coin 355 such that its outer periphery projects above the entrance to the coin guideway. The projecting portion of the coin 355 provides a convex surface adjacent the concave shoulder 328 of the recess 326. With the coin 355 thus positioned, the pin 320 will ride over the surface of the coin and out of the recess 326. This frees the ratchet bar 308, and hence the operating arm 60, for movement requisite to proper cycling of the vending machine. Hence, the coin 355 at the upper end of the coin guideway behaves as a cam in deflecting the pin 320 out of the recess 326 and into the longitudinally extending portion of the slot 325. Insertion of a single coin into the guideway less than the amount required by selective placement of the pin member 352 through one of the holes 350 will fail to provide the necessary camming action to unlock the ratchet bar 308 and operating arm 60. The necessary camming will be provided only when the required last coin 355 has been added.

A cam 358 having three projecting ears 359–361, respectively, is pivotally connected at 363 to a platform 365 fixedly secured to and extending from the side plate 300. As will be apparent in FIGS. 18 and 19, when the ratchet bar 308 is extended by movement of the operating arm 60, the ratchet bar engages the ear 361 of the cam 358 and thereby pivots the cam so that the ear 359 engages one end of a money deposit trip-lever 367.

The opposite end of the money deposit trip-lever 367 is fixedly secured to the outside surface of the coin guideway plate 342, so that engagement of the trip-lever by the ear 359 of the cam 358 causes the lever to pivot the plate 342 as shown in FIG. 19. When the plate 342 is pivoted in this manner, it removes the pin member 352 from the hole 350 in the plates 341 and 342 so that the pin member no longer blocks the coin guideway. This causes the row of coins previously supported in the guideway by the pin member to move down the guideway and drop into a deposit chute 370 (see FIGS. 5 and 15) which communicates with a vending machine money box (not shown) in the machine cabinet 30.

A coin return lever 372, the upper end of which is adapted to operably engage the coin return button 56 of the cabinet cover 45 in FIG. 1, is pivotally connected at 373 (see FIG. 16) to a supporting flange 375 extending from the side plate 300. The lower end of the coin return lever 372 is pivotally connected to one end of a linkage 377, the other end of the linkage being connected to a coin return trip-lever 380. The coin return trip-lever 380 extends through a clearance slot 382 (see FIG. 16) in the plate 342 and is affixed to the plate 341. When the coin return lever 372 is pivoted to the right in FIG. 16, the linkage 377 moves upward in FIG. 20. This causes the trip-lever 380 and plates 341, 342 to pivot against the forces of the springs 345, so that the lower ends of the plates 341, 342 move away from the side plate 300. Hence, the flange 348 of the plate 341 breaks contact with the plate 300 and allows the coins in the guideway to drop vertically into the coin return chute 339 positioned below the guideway (see FIGS. 4, 5 and 16).

However, once the vending machine has been unlocked, and the operating arm 60 extends the ratchet bar 308 sufficiently to contact the ear 361 of the cam 358, the ear 360 is pivoted to a position abutting the coin return lever 372 (see FIG. 18). Hence, the coin return lever 372 is disabled and cannot be actuated by the coin return button 56 if the operating arm 60 has been moved from its uppermost position. This arrangement enables the machine to either issue policies or return coins, but not both for any single transaction, and hence renders the machine relatively tamperproof in this regard.

The form-issuing vending machine of the present invention satisfies a long-existing need in the art for a rugged and reliable unit having improved paper handling, coin control, and drum drive and indexing mechanisms which are less prone to the difficulties previously encountered with vending machine devices heretofore available.

It will be apparent from the foregoing that, while a particular form of my invention has been illustrated and described, various modifications can be made without departing from the spirit and scope of my invention. Accordingly, I do not intend that my invention be limited, except as by the appended claims.

What is claimed is:

1. In a vending machine, a coin control mechanism comprising:
   - a plurality of elongated parallel plates in abutment to form a coin guideway having open upper and lower ends;
   - one of said plates carrying a coextensive flange traversing the width of said guideway and normally sealing the lower side of said guideway along its length;
   - the outermost of said plurality of plates having a row of aligned uniformly spaced holes along the length of said guideway;
   - a pin member adapted to be inserted through a selected one of said holes to block said guideway at a selected point along its length;
   - a coin deposit chute communicating with the lower open end of said guideway;
   - a first trip-lever connected to one of said outermost plates for selectively pivoting said plate to remove said pin member from said guideway and thereby release coins within said guideway to said deposit chute;
   - a coin return chute extending below said coin guideway; and
   - a second trip-lever connected to said plate carrying said flange and adapted to pivot said plate to open the lower side of said guideway and thereby drop all coins within said guideway into said return chute.

2. A coin control mechanism as set forth in claim 1, including:
   - actuating means for said second trip-lever; and
   - cam means for actuating said first trip-lever and simultaneously disabling the actuating means for said second trip-lever.

3. A coin control mechanism as set forth in claim 2, wherein said cam means is actuated by longitudinal displacement of a ratchet bar.

References Cited by the Examiner

UNITED STATES PATENTS

| | | | |
|---|---|---|---|
| 433,258 | 7/90 | Thrall | 225—91 X |
| 2,331,635 | 10/43 | Streckfuss. | |
| 2,638,198 | 5/53 | Wellstein. | |
| 2,706,550 | 4/55 | Gray. | |

ROBERT B. REEVES, *Acting Primary Examiner.*

ERNEST A. FALLER, Jr., *Examiner.*